United States Patent [19]
Kin et al.

[11] Patent Number: 5,493,893
[45] Date of Patent: Feb. 27, 1996

[54] APPARATUS FOR DETECTING WHEEL GRIP ON ROAD

[75] Inventors: Keiyu Kin; Yuji Sakaki, both of Wako, Japan

[73] Assignee: Honda Giken Kogyo Kabushiki Kaisha, Tokyo, Japan

[21] Appl. No.: 296,414

[22] Filed: Aug. 26, 1994

[30] Foreign Application Priority Data

Sep. 29, 1993 [JP] Japan ................................. 5-242863

[51] Int. Cl.⁶ .................................................. G01N 19/02
[52] U.S. Cl. .............................................. 73/9; 364/424.01
[58] Field of Search ..................... 73/9, 10; 364/424.01, 364/426.01

[56] References Cited

U.S. PATENT DOCUMENTS

| | | | |
|---|---|---|---|
| 3,992,922 | 11/1976 | Noble | 73/9 |
| 3,993,270 | 11/1976 | Gallacher | 73/9 X |
| 4,212,063 | 6/1980 | Hiidmark | 73/9 X |
| 4,545,220 | 10/1985 | Leiber | 73/9 X |
| 4,882,693 | 11/1989 | Yopp | 73/9 X |
| 5,394,329 | 2/1995 | Bridgen | 73/9 X |

Primary Examiner—Thomas P. Noland
Attorney, Agent, or Firm—Nikaido, Marmelstein, Murray & Oram

[57] ABSTRACT

An apparatus for detecting a wheel grip on a road has a wheel speed sensor for detecting a revolution speed of a wheel of a vehicle, a plurality of band-pass filters for filtering an output of the wheel speed sensor at a plurality of frequency bands, and a reference value memory device for storing in memory reference values dependent on the revolution speed of the wheel. The reference values are set for each of the frequency bands of the plurality of band-pass filters. The wheel grip on road is detected based on the correlation between that signal output for each of the frequency bands which is obtained through the band-pass filters and that reference value for each of the frequency bands which is stored in memory in the reference value memory device.

3 Claims, 2 Drawing Sheets

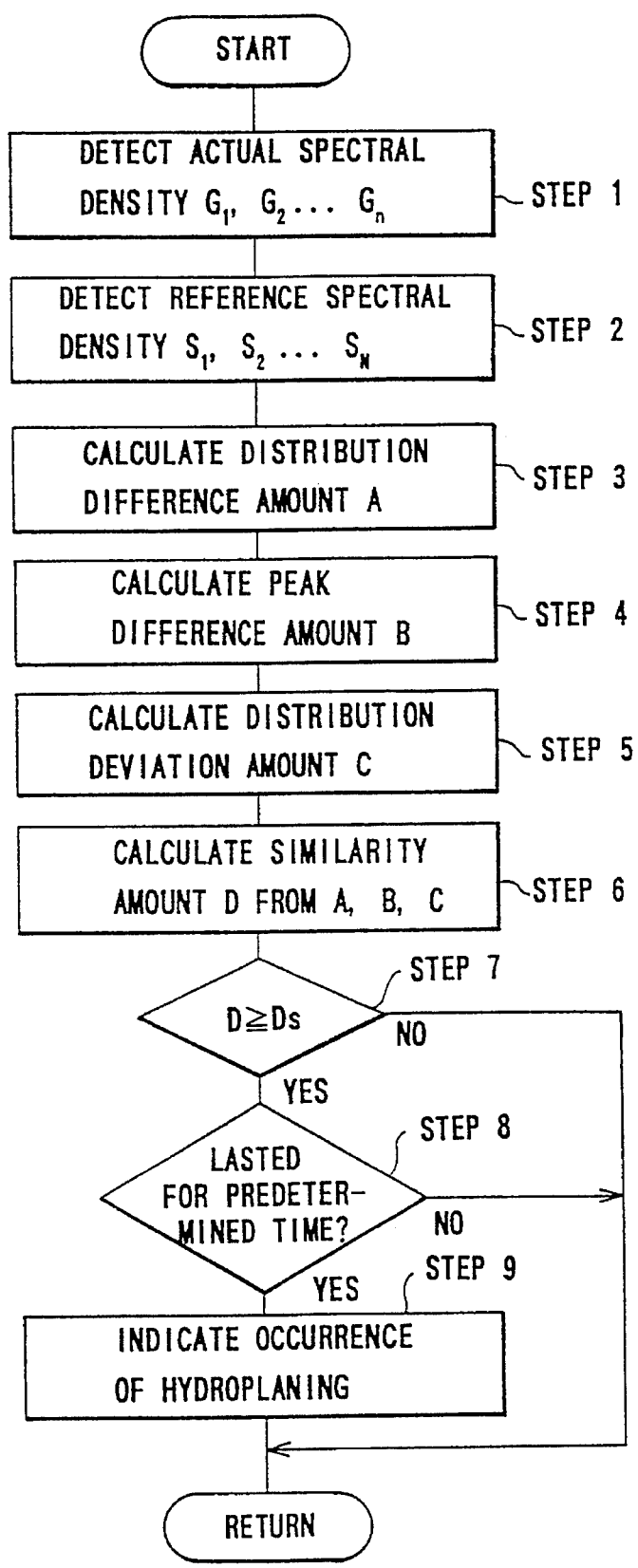

APPARATUS FOR DETECTING WHEEL GRIP ON ROAD

BACKGROUND OF THE INVENTION

1. Field of the Invention

The present invention relates to an apparatus for detecting a wheel grip on a road, i.e., a condition of wheel contact with the ground, in order to detect so-called hydroplaning or aquaplaning phenomena which occur when a vehicle is running at a high speed on a road surface which is wet with water.

2. Description of Related Art

The hydroplaning phenomena can be classified into a complete hydroplaning in which wheels of the vehicle are completely running on a film of water and a partial hydroplaning in which, though the wheels of the vehicle are lifted or suspended by the film of water, the wheels are still partially maintaining contact with the road surface.

Once the complete hydroplaning phenomena have occurred, the wheels come to be subjected to a strong resistance from the film of water. It is known, then, to detect the occurrence of the hydroplaning phenomena based on differential changes in a revolution speed of the wheels of the vehicle.

In the partial hydroplaning, however, the resistance that the wheels receive from the film of water is not very large. Therefore, it is difficult to detect the occurrence of the partial hydroplaning by the conventional method.

As a result of diligent studies, the inventors of the present invention have found out that, once the partial hydroplaning has occurred, those frequency components of higher harmonics which are contained in an output signal of a wheel speed sensor for detecting a revolution speed of a wheel deviate by several Hz towards the low-frequency side by receiving a viscous resistance due to the film of water.

The present invention has been made based on this finding, and has an object of providing an apparatus that can detect the occurrence of the partial hydroplaning.

SUMMARY OF THE INVENTION

In order to attain the above and other objects, the present invention is an apparatus for detecting a wheel grip on a road comprising: a wheel speed sensor for detecting a revolution speed of a wheel of a vehicle; a plurality of band-pass filters for filtering an output of the wheel speed sensor at a plurality of frequency bands; reference value memory means for storing in memory reference values dependent on the revolution speed of the wheel, the reference values being set for each of the frequency bands of the plurality of band-pass filters; and detecting means for detecting the wheel grip on road based on a correlation between that signal output for each of the frequency bands which is obtained through the band-pass filters and that reference value for each of the frequency bands which is stored in memory in the reference value memory means.

In accordance with another aspect of the invention, the apparatus for detecting a wheel grip on a road comprises: a wheel speed sensor for detecting a revolution speed of a wheel of a vehicle; a band-pass filter for filtering an output of the wheel speed sensor at a predetermined frequency Dana which varies with a vehicle speed; reference value memory means for storing in memory a reference value dependent on the vehicle speed, the reference value being set for the frequency band of the band-pass filter; and detecting means for detecting the wheel grip on road based on a correlation between a signal output which is obtained through the band-pass filter and the reference value which is stored in memory in the reference value memory means.

In this case, it is preferable to provide correction means for correcting at least one of the frequency band of the band-pass filter and the reference value based on a running condition on a dry road.

The wheels of the vehicle give rise to minute rotational vibrations attributable to tread patterns or the like of tires and, consequently, vibration components of higher harmonics appear in the output signal of the wheel speed sensor. While the spectral density distribution of each frequency component to be contained in the output signal is as shown in a curve "a" in FIG. 1, it deviates by several Hz towards the low-frequency side as shown by a curve "b" in FIG. 1 when the partial hydroplaning has occurred. In addition, the spectral density distribution varies with the vehicle speed; if the vehicle speed increases, the spectral density distribution deviates towards the high-frequency side.

In this manner, if the spectral density of each of the frequency bands of the output of the wheel speed sensor at the time of running on the dry road is obtained in advance for respective vehicle speeds and is stored in memory as reference values, it can be judged whether the partial hydroplaning has occurred or not by checking the correlation between that signal output representing the spectral density at each of the frequency bands which can be obtained by filtering the output of the wheel speed sensor by the plurality of the band-pass filters, and that reference value at each of the frequency bands which corresponds to the vehicle speed at the present moment.

The occurrence of the partial hydroplaning can also be detected by memorizing in advance that predetermined frequency band dependent on the vehicle speed at which the spectrum density distribution becomes a peak at the time of running on the dry road as well as a reference value that is the peak value, and then by checking the correlation between the output signal that can be obtained by filtering the output of the wheel speed sensor at the predetermined frequency band corresponding to the vehicle speed at the present moment and the reference value. According to this arrangement, the number of the frequency bands to be compared can be reduced, thereby enabling a high-speed processing. By the way, there are cases where the frequency band at which the spectral density distribution becomes a peak and its peak value vary due to the wear or changing of the tires or the like, or to the deterioration of bushes for the wheel suspensions or the like. Therefore, if the frequency band to filter the output of the vehicle speed sensor as well as the reference value are arranged to be corrected based on the result of running on the dry road, the above-described changes can advantageously be coped with.

BRIEF DESCRIPTION OF THE DRAWINGS

The above and other objects and the attendant advantages of the present invention will become readily apparent by reference to the following detailed description in conjunction with the accompanying drawings wherein:

FIGS. 3(A) and 3(B) are diagrams showing spectral density distributions, in which FIG. 3(A) is a diagram representing a reference spectral density of each frequency band and FIG. 3(B) is a diagram representing an actual spectral density of each frequency band; and FIG. 4 is a flow chart for discriminating a correlation between an output signal from a band-pass filter and a reference value.

DETAILED DESCRIPTION OF A PREFERRED EMBODIMENT

Figure 1:
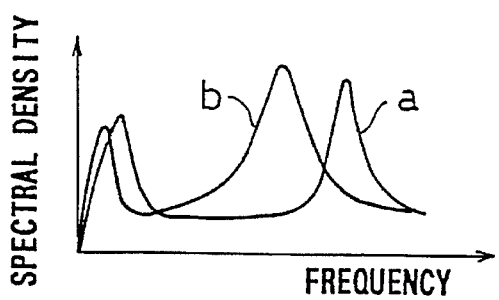
FIG. 1 is a diagram showing the frequency characteristics of vibration components contained in an output signal of a wheel revolution speed sensor.
Figure 2:
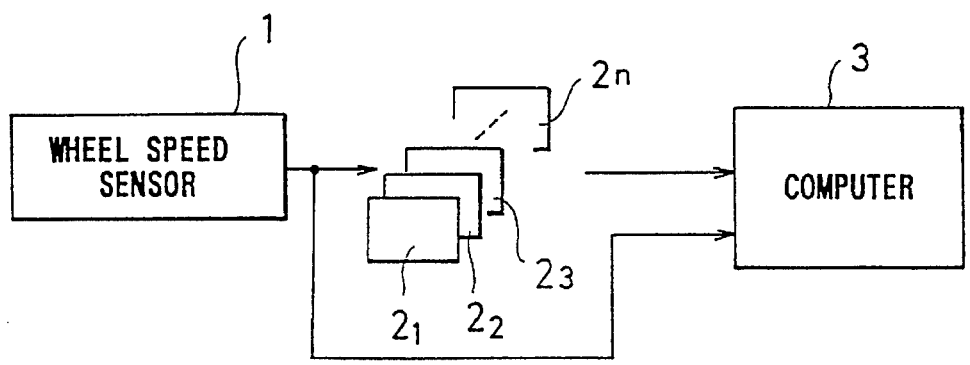
FIG. 2 is a system diagram showing an example of the present invention apparatus.

Referring to FIG. 2, numeral 1 denotes a wheel speed sensor for detecting a revolution speed of a wheel W of a vehicle. An output signal of the wheel speed sensor 1 is filtered at a plurality of frequency bands by means of a plurality of band-pass filters $2_1, 2_2, \ldots 2_n$. The filtered signals of these frequency bands are inputted to a computer 3 which is mounted on the vehicle.

Figure 3A:
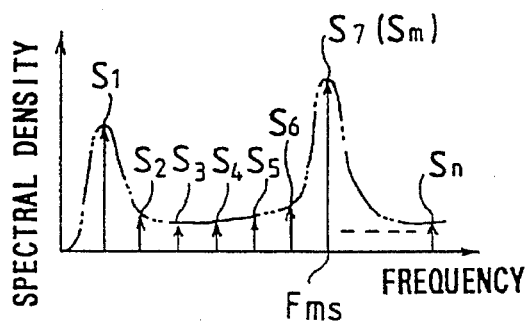

In the computer 3 there are stored in memory reference values $S_1, S_2, \ldots S_n$ (see FIG. 3(A)) which correspond to spectral densities, in running on a dry road, of each of the frequency bands of the output signal of the wheel speed sensor as filtered at the above-described plurality of frequency bands. Since the spectral density distribution varies with the vehicle speed, reference values $S_1, S_2, \ldots S_n$ for respective vehicle speeds are mapped and stored in memory.

Figure 3B:
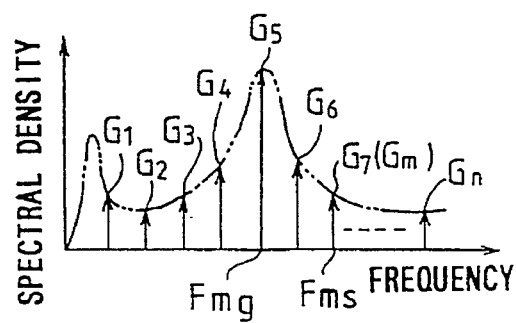

The computer 3 performs the following operations in sequence according to the program shown in FIG. 4, namely a processing for obtaining spectral densities $G_1, G_2, \ldots G_n$ (see FIG. 3(B)) of the filtered signal at each of the frequency bands to be inputted from the above-described band-pass filters $2_1, 2_2, \ldots 2_n$ (step 1), a processing of searching those reference values $S_1, S_2, \ldots S_n$ corresponding to the vehicle speed at the present moment which are isolated or obtained by the signal of the wheel speed sensor 1 (step 2), and a processing of discriminating or determining the correlation between $G_1, G_2, \ldots G_n$ and $S_1, S_2, \ldots S_n$. As a result of these operations, the occurrence of the partial hydroplaning is detected.

In the processing of discriminating the correlation between $G_1, G_2, \ldots G_n$ and $S_1, S_2, \ldots S_n$, a total amount of difference A between an actual spectral density distribution and a reference spectral density distribution is obtained by the following formula (step 3)

$$A = \sum_{i=1}^{n} |Gi - Si|$$

Also, an amount of difference B between a peak value Sm ($S_7$ in FIG. 3(A)) of the reference spectral density distribution and the actual spectral density Gm ($G_7$ in FIG. 3(B)) at a frequency band Fms that is the same as that of the peak value Sm is obtained by the following formula (step 4)

$$B = |Sm - Gm|$$

Further, an amount of deviation C of the actual spectral density distribution relative to the reference spectral density distribution is obtained from the peak frequency bands Fmg, Fms of the respective spectral density distributions by the following formula (step 5)

$$C = |Fmg - Fms|$$

An amount of similarity D which represents the correlation between the actual spectral density distribution pattern and the reference spectral density distribution pattern and which can be defined by the following formula is calculated $$D = Ka \cdot A + Kb \cdot B + Kc \cdot C$$

where Ka, Kb and Kc are constants.

Then, a discrimination value Ds is set with respect to D and, when a condition of $D \geq Ds$ has lasted for a predetermined period of time (steps 7, 8), a judgement is made that a partial hydroplaning has occurred, thereby indicating the occurrence of hydroplaning (step 9).

On the wet road there is a tendency that the spectral density is attenuated even during the grip running (i.e. running in a condition in which the wheels of the vehicle stay firmly on the road). Since the reference value is set to the spectral density on the dry road, when the running of the vehicle on the wet road has been detected by means of a wiper switch, moisture sensor or the like, the spectral density of that filtered signal of each frequency band which is inputted by each of the band-pass filters is multiplied by a predetermined attenuation correction coefficient dependent on the frequency band. The above-described $G_1, G_2, \ldots G_n$ are thus obtained.

The discrimination of the correlation between the actual spectral densities $G_1, G_2, \ldots G_n$ and the reference spectral densities $S_1, S_2, \ldots S_n$ can also be made by the following formula by calculating the sum of products (inner products) of the actual spectral densities and the reference spectral densities $$E = \sum_{i=1}^{n} (Si \times Gi)$$

In this case, if the vehicle is running on the dry road, the value E will fall within a predetermined range. Therefore, the partial hydroplaning can be judged to have occurred if the value E has fallen out of the above-described range.

In the above-described embodiment, an arrangement has been made such that the correlation between the actual spectral densities and the reference spectral densities at a plurality of frequency bands is discriminated. However, it is also possible to detect the occurrence of the partial hydroplaning by obtaining the actual spectral density Gm at the peak frequency band Fms of the reference spectral density distribution corresponding to the vehicle speed at the present moment, and then by comparing this actual spectral density Gm and the reference spectral density Sm at the peak frequency band Fms. In this case, in order to be able to cope with the changes in the values Fms and Sm due to the wear or change in the tires, or to the deterioration of bushes for suspensions, or the like, it is preferable to learn the values Fms and Sm when a judgement of running on the dry road has been made by means of the wiper switch, the moisture sensor, or the like, to thereby correct the values of Fms and Sm stored in memory.

As can be seen from the above-described explanation, according to the present invention, by carrying out the frequency analysis of the vibrations of higher harmonics contained in the output signal of the vehicle speed sensor, that occurrence of the partial hydroplaning which was conventionally unable to be detected can also be detected.

It is readily apparent that the above-described apparatus for detecting a wheel grip on road meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for detecting a wheel grip on a road comprising:
    a wheel speed sensor for detecting a revolution speed of a wheel of a vehicle;
    a band-pass filter for filtering an output of said wheel speed sensor at a predetermined frequency band which varies with a vehicle speed;
    reference value memory means for storing in memory a reference value dependent on the vehicle speed, said reference value being set for the frequency band of said band-pass filter; and
    detecting means for detecting the wheel grip on the road based on a correlation between a signal output which is obtained through the band-pass filter and the reference value which is stored in memory in said reference value memory means.

2. An apparatus for detecting a wheel grip on a road according to claim 1, further comprising correction means for correcting at least one of the frequency band of said band-pass filter and the reference value based on a result of running on a dry road.

3. An apparatus for detecting a wheel grip on the road according to claim 1, wherein said band-pass filter is one of a plurality of band-pass filters, wherein each filter of the plurality of band-pass filters are configured to filter different frequency bands;

and wherein said reference value memory means stores a reference value from a plurality of reference values, each reference value being set for respective frequency bands of said plurality of band-pass filters; and said detecting means obtains said correlation between signals output for each of the frequency bands obtained through said plurality of band-pass filters and the reference value for each of the frequency bands which is stored in said reference value memory means.

* * * * *